US008627407B1

(12) United States Patent
Satish et al.

(10) Patent No.: US 8,627,407 B1
(45) Date of Patent: Jan. 7, 2014

(54) SYSTEMS AND METHODS FOR PREVENTING UNAUTHORIZED MODIFICATION OF NETWORK RESOURCES

(75) Inventors: Sourabh Satish, Fremont, CA (US); Nishant Doshi, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 970 days.

(21) Appl. No.: 12/147,642

(22) Filed: Jun. 27, 2008

(51) Int. Cl.
*H04L 9/32* (2006.01)

(52) U.S. Cl.
USPC ............... 726/2; 726/5; 726/28; 709/229

(58) Field of Classification Search
USPC ................................ 726/2, 5, 28; 709/229
See application file for complete search history.

(56) References Cited

U.S. PATENT DOCUMENTS

| 7,197,646 | B2* | 3/2007 | Fritz et al. ................. 713/182 |
| 7,512,978 | B1* | 3/2009 | Screen et al. ................. 726/22 |
| 7,603,706 | B2* | 10/2009 | Donnelly et al. ............ 726/22 |
| 7,725,395 | B2* | 5/2010 | Rui et al. ..................... 705/50 |
| 7,770,209 | B2* | 8/2010 | Billingsley et al. ........... 726/2 |
| 7,827,265 | B2* | 11/2010 | Cheever et al. ............. 709/223 |
| 7,841,940 | B2* | 11/2010 | Bronstein .................... 463/29 |
| 8,495,727 | B2* | 7/2013 | Ramanathan et al. ...... 726/14 |
| 2006/0253579 | A1* | 11/2006 | Dixon et al. ................ 709/225 |
| 2006/0287963 | A1* | 12/2006 | Steeves et al. .............. 705/64 |
| 2007/0143624 | A1* | 6/2007 | Steeves ....................... 713/182 |
| 2007/0165821 | A1* | 7/2007 | Altberg et al. ......... 379/210.02 |
| 2007/0250920 | A1* | 10/2007 | Lindsay ........................ 726/7 |
| 2008/0089499 | A1* | 4/2008 | Hahn et al. ............. 379/114.2 |
| 2008/0127302 | A1* | 5/2008 | Qvarfordt et al. ............ 726/2 |
| 2008/0133676 | A1* | 6/2008 | Choisser et al. ............ 709/206 |
| 2008/0134323 | A1* | 6/2008 | Pinkas et al. ................. 726/21 |
| 2008/0184346 | A1* | 7/2008 | Pinkas et al. ................. 726/5 |
| 2008/0314968 | A1* | 12/2008 | Maher ........................ 235/375 |
| 2009/0083826 | A1* | 3/2009 | Baribault ...................... 726/1 |

OTHER PUBLICATIONS

"CAPTCHA: Telling Humans and Computers Apart Automatically" Published Jun. 21, 2007 as verified by the Internet Archive (3 pages) http://replay.waybackmachine.org/20070621111739/http://www.captcha.net/.*
Wikipedia article for "CAPTCHA" as published on Sep. 16, 2006. (4 pages)   http://en.wikipedia.org/w/index.php?title=CAPTCHA&oldid=76044483.*

(Continued)

*Primary Examiner* — Darren B Schwartz
*Assistant Examiner* — Thomas Gyorfi
(74) *Attorney, Agent, or Firm* — ALG Intellectual Property, LLC

(57) ABSTRACT

A computer-implemented method for preventing modification of network resources in the absence of a user's consent is disclosed. The method may comprise: 1) identifying an attempt to modify a network resource, 2) administering a human-verification test, and 3) determining, based on the outcome of the human-verification test, whether to prevent modification of the network resource. In addition, a computer-implemented method for preventing unauthorized communication with network resources may comprise: 1) identifying a communication attempt between a network resource and an untrusted resource, 2) determining whether communication between the network resource and the untrusted resource is authorized, and 3) determining, based on whether communication between the network resource and the untrusted resource is authorized, whether to allow communication between the network resource and the untrusted resource. Corresponding systems and computer-readable media are also disclosed.

11 Claims, 8 Drawing Sheets

(56) References Cited

OTHER PUBLICATIONS

Luis von Ahn et al. "CAPTCHA: Using Hard AI Problems for Security" Proceedings of Eurocrypt 2003: Advances in Cryptology [LNCS 2656] (pp. 294-311) http://www.cs.cmu.edu/~biglou/captcha_crypt.pdf.*

"Implementing client side CAPTCHA" Published Mar. 7, 2008 (1 page) http://djenya.com/2008/03/07/implementing-client-side-captcha.*

"Key Terms: cyber threats and meanings" Article dated Jan. 18, 2006 as verified by the Internet Archive (5 pages) http://web.archive.org/web/20060118130747/http://www.lavasoft.de/trackware_info/terms/.*

"Spyware, viruses, & security forum: Drive-by installer?" Various forum posts at cnet.com dated Mar. 31, 2004 (11 pages) http://forums.cnet.com/7723-6132_102-17884/drive-by-installer/.*

"Thomas Brunt's Outfront since 1998: Client side form validation (Jcap)". Forum thread from Jul. 9, 2007-Jul. 12, 2007 (2 pages) http://www.frontpagewebmaster.com/m-369180/tm.htm#369360.*

* cited by examiner

SYSTEMS AND METHODS FOR PREVENTING UNAUTHORIZED MODIFICATION OF NETWORK RESOURCES

BACKGROUND

Malicious programmers are constantly attempting to exploit computing systems by creating malicious software programs (malware) such as viruses, worms, and Trojan horses. In some situations, malicious programmers may attempt to compromise a user's local area network (LAN) router by creating a malicious script embedded in a webpage visited by the user that causes the user's computing device to alter or modify one or more settings of the user's router.

For example, a malicious programmer may gain access to a user's LAN router by embedding a script within a webpage visited by the user that causes the user's computing device to: 1) connect to the user's router (a fairly straightforward approach given the finite number of IP addresses commonly allotted to LAN routers), and then 2) attempt to gain administrative access to the router. Because consumer-grade routers often work with their default settings, consumers commonly fail to change the default administrative passwords on such routers. Even when altered, malicious scripts may quickly guess administrative passwords using dictionary attacks since most consumer-grade routers do not introduce timing penalties for incorrect login attempts.

Once administrative access is granted, the malicious script may alter or modify many, if not all, of the router's settings. For example, the malicious script may specify a DNS server under the control of a malicious programmer in place of a legitimate DNS server, such as a server suggested by an upstream node (such as an Internet Service Provider). In this example, all subsequent domain-name resolutions will be controlled through the malicious server. Such an attack, sometimes referred to as "drive-by pharming," is oftentimes difficult to detect because it occurs outside the home or small office and outside of the Internet.

SUMMARY

As will be described in greater detail below, the instant disclosure generally relates to system and methods for preventing unauthorized modification of network resources, such as local network devices and services. In one example, a security component stored on a user's computing device may prevent the computing device from modifying a local network resource (such as a router) without the user's consent. In an additional embodiment, a security agent stored on a network resource may prevent the network resource from communicating with unauthorized devices and services.

For example, a method for preventing modification of local network resources in the absence of a user's consent may comprise: 1) identifying an attempt to modify a network resource (such as an attempt by the user's computer), 2) administering a human-verification test to verify that a human is attempting to modify the network resource, and then 3) determining, based on the outcome of the human-verification test, whether to prevent modification of the network resource.

In one example, the system may identify an attempt to modify a network resource by: 1) detecting or identifying content received from a network resource (by, for example, detecting or identifying content received from an intranet zone or an intranet IP address) and then 2) determining whether the content received from the network is a form or otherwise facilitates user input.

In one example, the human-verification test (which may, as detailed below, represent a CAPTCHA or any other Turing test) may be administered by embedding the human-verification test within a web browser of the user's computing device. If an incorrect response to the human-verification test is provided (or if no response is provided), then the system may prevent the computing device from transmitting data to the network resource. Alternatively, the system may allow the computing device to transmit data to the network resource if a correct response to the human-verification test is provided.

As detailed above, the systems and methods described herein may also utilize an on-host security agent stored on a network resource for preventing unauthorized communication with the network resource. For example, a method for preventing unauthorized communication with network resources may comprise: 1) identifying a communication attempt between a network resource and an untrusted resource (i.e., identifying an attempt by the untrusted resource to transmit data to the network resource and/or identifying an attempt by the network resource to transmit data to the untrusted resource), 2) determining whether communication between the network resource and the untrusted resource is authorized, and then 3) determining, based on whether communication between the network resource and the untrusted resource is authorized, whether to allow communication between the network resource and the untrusted resource.

If communication between the untrusted resource and the network resource is not authorized, communication may be prevented by: 1) blocking data from the untrusted resource and/or 2) preventing the network resource from transmitting data to the untrusted resource. In one example, communication with a network resource may be limited to trusted operating-system components, trusted applications, authorized ports, and/or authorized protocols. The method may also comprise determining whether one or more settings of a network resource has been changed or modified and then transmitting a notification that identifies the settings change or modification to a user of the network resource.

Systems and computer-readable media corresponding to the above-described methods are also disclosed. Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
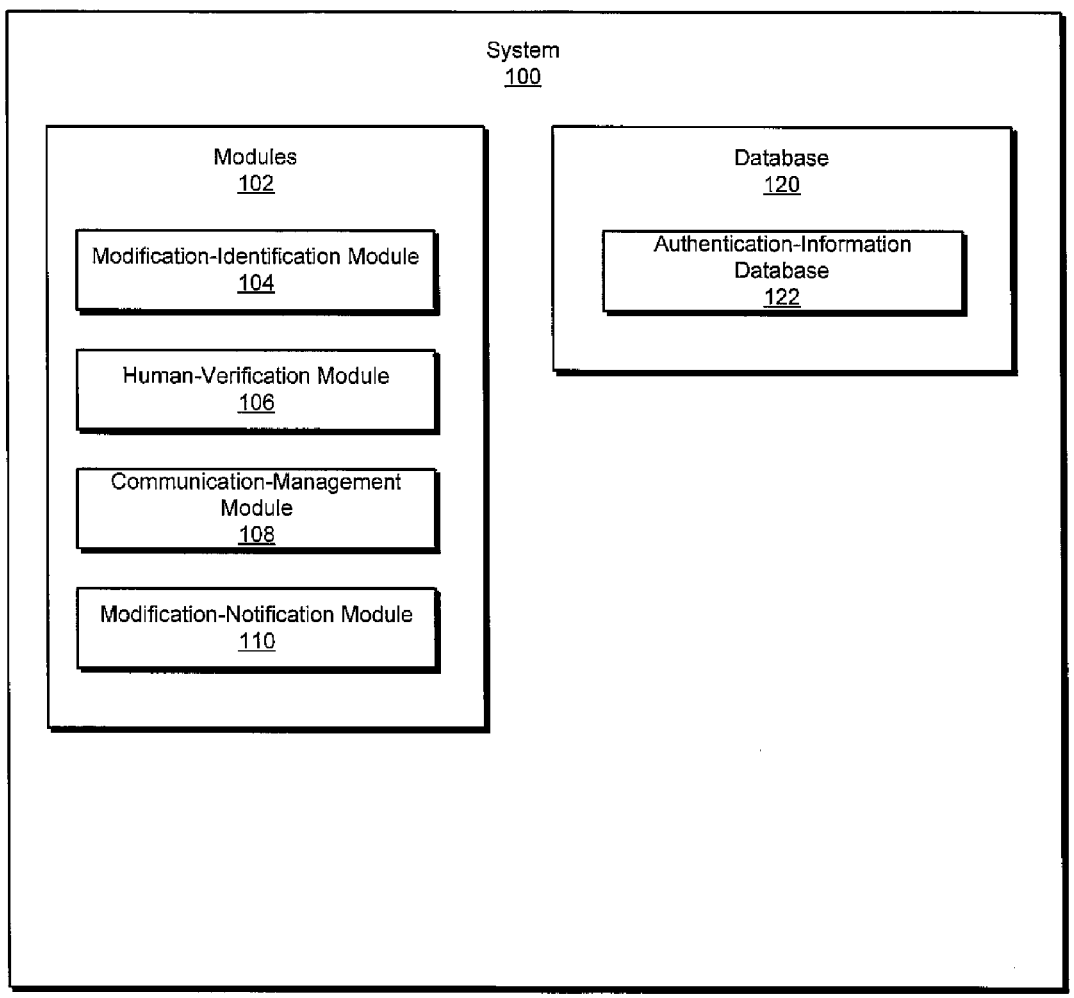
FIG. 1 is a block diagram of an exemplary system for preventing unauthorized modification of network resources.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims

DETAILED DESCRIPTION OF EXEMPLARY EMBODIMENTS

As will be described in greater detail below, the instant disclosure generally relates to systems and methods for preventing unauthorized modification of network resources. In one example, an in-browser security component on a computing device may prevent the computing device from modifying a local network resource (such as a router) without the consent of a user of the computing device. In an additional example, a security agent stored on a network resource may prevent the network resource from communicating with unauthorized devices and services.

As used herein, the phrase "network resource" generally refers to any type or form of networked device or network service. Examples of networked-connected devices include, without limitation, computing devices (such as routers, gateways, and servers), telecommunication devices (such as VOIP phones), consumer electronic devices, appliances, or any other network-connected device. Similarly, examples of network services include, without limitation, authentication services, directory services, DNS services, e-mail hosting services, web-hosting services, or any other network service.

Figure 2:
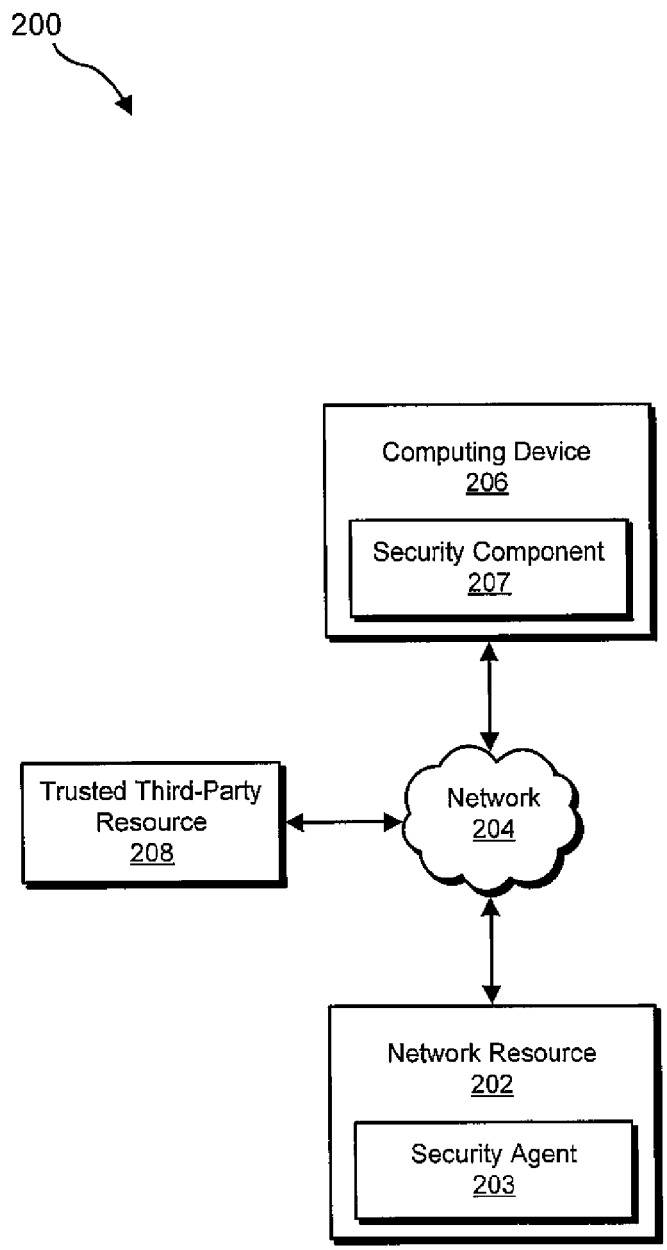
FIG. 2 is a block diagram of an exemplary system for preventing unauthorized modification of network resources.

The following will provide, with reference to FIGS. 1-2, detailed descriptions of exemplary systems for preventing unauthorized modification of network resources. A description of corresponding exemplary computer-implemented methods will also be provided in connection with FIGS. 3 and 6. In addition, a description of an exemplary human-verification test for verifying that a human is operating a computing device will be provided in connection with FIG. 5.

FIG. 1 is a block diagram of an exemplary system 100 for preventing unauthorized modification of network resources. As illustrated in FIG. 1, exemplary system 100 may comprise one or more modules 102 for performing one or more tasks. For example, exemplary system 100 may comprise a modification-identification module 104 for identifying attempts to communicate with or modify a network resource.

Exemplary system 100 may also comprise a human-verification module 106 for administering a human-verification test designed to verify that a human is operating a computing device. In addition, exemplary system 100 may comprise a communication-management module 108 for managing communication with network resources. Exemplary system 100 may also comprise a modification-notification module 110 for creating and transmitting notifications that identify a change or modification to a network resource.

As illustrated in FIG. 1, exemplary system 100 may also comprise one or more databases 120. For example, exemplary system 100 may comprise an authentication-information database 122 for storing authentication information used to access network resources. Although illustrated as a single device, database 120 in FIG. 1 may represent portions of a plurality of databases or computing devices.

In certain embodiments, one or more of modules 102 may represent one or more software applications or programs that, when executed by a computing device, may cause the computing device to perform one or more tasks required to prevent unauthorized modification of network resources. For example, as will be described in greater detail below, one or more of modules 102 may represent software modules configured to run on one or more computing devices, such as the computing devices illustrated in FIG. 2 (e.g., network resource 202, computing device 206, and trusted third-party resource 208), FIG. 7 (e.g., computing system 710), and FIG. 8 (e.g., network architecture 800). One or more of modules 102 may also represent all or a portion of one or more special-purpose computers configured to perform one or more tasked required to prevent unauthorized modification of network resources.

In addition, database 120 in FIG. 1 may represent a portion of one or more computing devices. For example, database 120 may represent a portion of the exemplary computing systems illustrated in FIGS. 2, 7, and 8. Alternatively, database 120 may represent one or more physically separate devices capable of being accessed by a computing device, such as the exemplary computing devices illustrated in FIGS. 2, 7, and 8.

Exemplary system 100 in FIG. 1 may be deployed in a variety of ways. For example, all or a portion of exemplary system 100 may represent portions of a network-based system. FIG. 2 is an illustration of an exemplary network-based system 200 for preventing unauthorized modification of network resources. As illustrated in this figure, exemplary system 200 may comprise a network resource 202 in communication with a computing device 206 and a trusted third-party resource 208 via a network 204.

Network resource 202 generally represents any type or form of networked device or network service. As detailed above, examples of network resource 202 include, without limitation, networked devices (such as routers, gateways, servers, and VOIP phones) and network services (such as directory services, DNS services, and website hosting services).

As illustrated in FIG. 2, exemplary system 200 may also comprise a computing device 206. Computing device 206 generally represents any type or form of client-side computing device, such as a user's computing device, capable of executing computer-readable instructions. Exemplary system 200 may also comprise a trusted third-party resource 208. In one example, trusted third-party resource 208 may represent a server. As will be described in greater detail below, in certain embodiments network resource 202 may verify authentication information received from computing device 206 by communicating with trusted third-party resource 208.

In at least one embodiment, network resource 202 may communicate with computing device 206 and trusted third-party resource 208 via network 204. Network 204 generally represents any type or form of communication or computing network; including, for example, an intranet, a wide area network (WAN), a local area network (LAN), a personal area network (PAN), or the Internet.

In certain embodiments, one or more of the elements of exemplary system 200 may comprise one or more portions of exemplary system 100 in FIG. 1. For example, one or more of modules 102 in FIG. 1 may be stored and configured to run on network resource 202, computing device 206, and/or trusted third-party resource 208. For example, in one embodiment, network resource 202 may comprise a security agent 203 for preventing unauthorized communication with network resource 202. In this example, security agent 203 may comprise all or portions of modification-identification module 104, communication-management module 108, and/or modification-notification module 110 from FIG. 1.

Similarly, computing device 206 may comprise a security component 207 for preventing modification of network resource 202 in the absence of a user's consent. In this example, security component 207 may comprise all or portions of modification-identification module 104, human-verification module 106, communication-management module 108, and/or modification-notification module 110 from FIG. 1.

Figure 3:
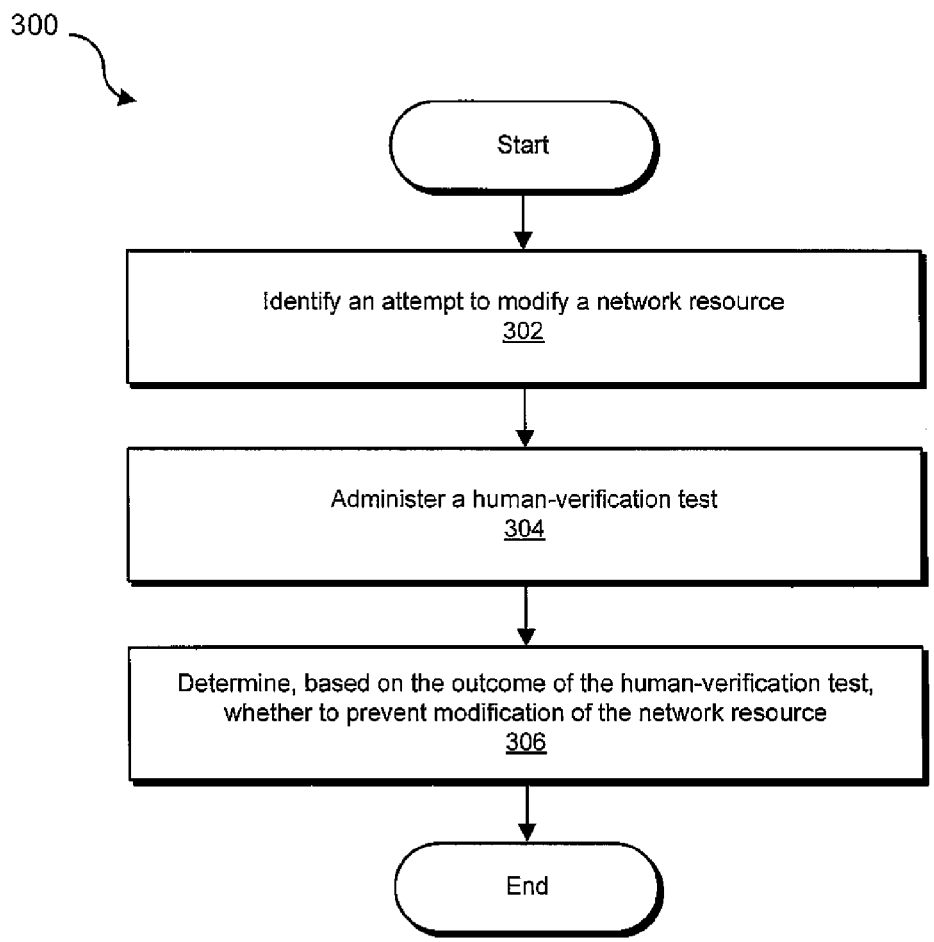
FIG. 3 is a flow diagram of an exemplary computer-implemented method for preventing modification of network resources in the absence of a user's consent.

FIG. 3 is a flow diagram of an exemplary computer-implemented method 300 for preventing a user's computing device from modifying a local network resource (such as a router) without the user's consent. As illustrated in this figure, at step 302 a system (such as exemplary system 100 in FIG. 1) may identify an attempt to modify a network resource. For example, security component 207 in FIG. 2 (which may, as detailed above, represent one or more of modules 102 in FIG. 1) may identify an attempt by computing device 206 to modify network resource 202.

Step 302 may be performed in a variety of ways. In one embodiment, step 302 may comprise: 1) identifying content received from a local network device and then 2) determining whether the content received from the network resource may facilitate modification of the network resource. Content received from a local network resource may be detected or identified in a variety of ways. For example, security component 207 on computing device 206 in FIG. 2 may detect or identify content received from an intranet zone or an intranet IP address, which may indicate that the content originated from a local network resource (such as a local router). Security component 207 may then determine whether the content received from the local network resource may facilitate modification of the network resource. For example, security component 207 may determine whether the content received from the network resource facilitates user input via a website or web-based form, such as exemplary webpage 400 illustrated in FIG. 4.

At step 304, the system may administer a human-verification test. For example, security component 207 on computing device 206 in FIG. 2 may administer a human-verification test to verify that a user is operating computing device 206. As used herein, the phrase "human-verification test" generally refers to any type or form of test that may be used to verify that a human is operating a computing device. Examples of human-verification tests include, without limitation, Turing tests (such as CAPTCHA tests) or any other suitable human-verification test.

Figure 4:
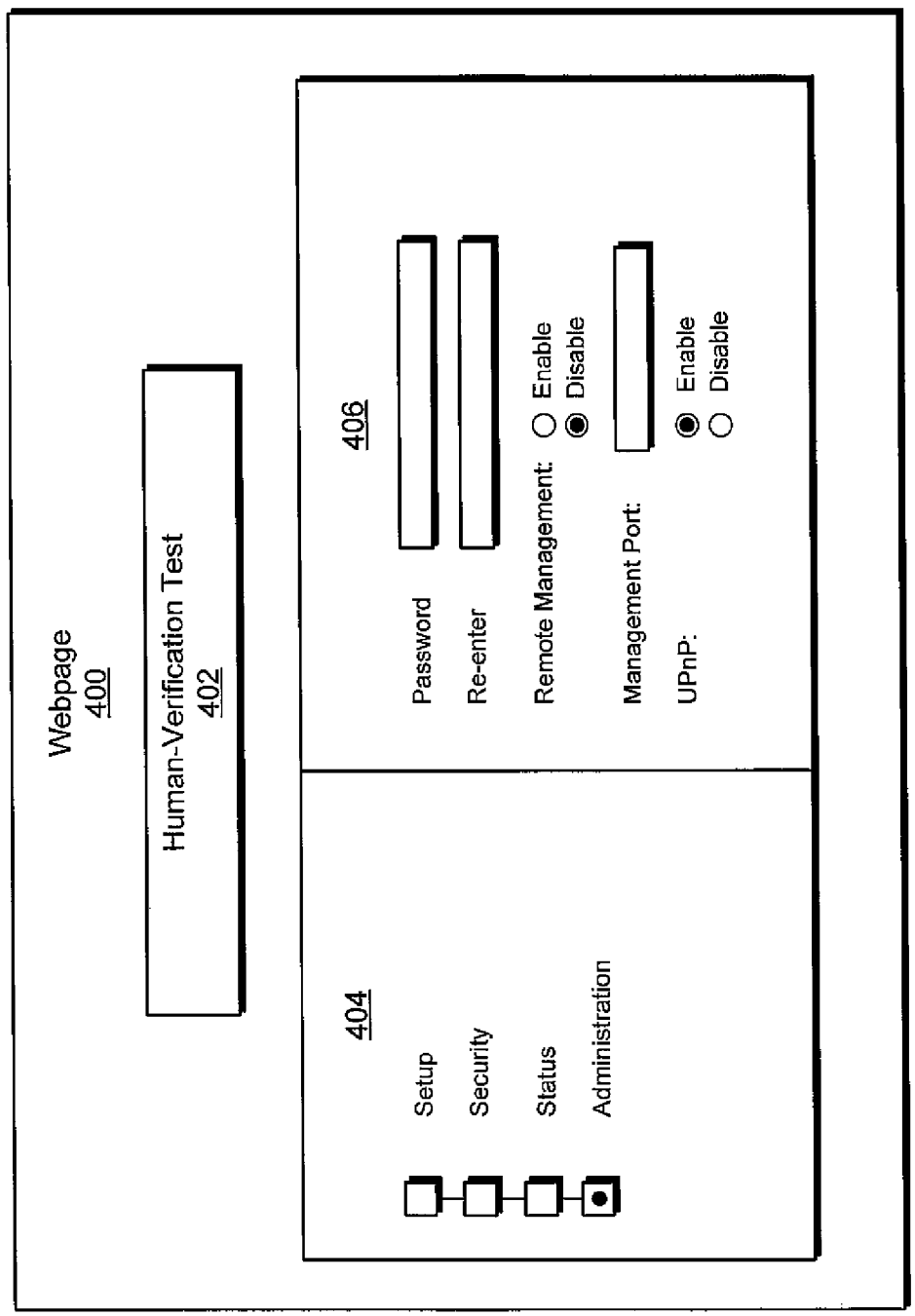
FIG. 4 is a block diagram of an exemplary human-verification test embedded within content received from a network resource.

Step 304 may be performed in a variety of ways. In one embodiment, security component 207 may embed a human-verification test within the content received from network resource 202. FIG. 4 is an illustration of an exemplary human-verification test 402 embedded within a webpage 400 received from network resource 202 in FIG. 2. In this example, webpage 400 may represent a form for allowing a user to modify one or more settings of network resource 202, which, in this example, may represent a router. As illustrated in FIG. 4, webpage 400 may comprise a first display area 404 for displaying one or more settings categories and a second display area 406 for receiving user input for modifying network resource 202. In this example, security component 207 may embed human-verification test 402 within webpage 400.

Figure 5:
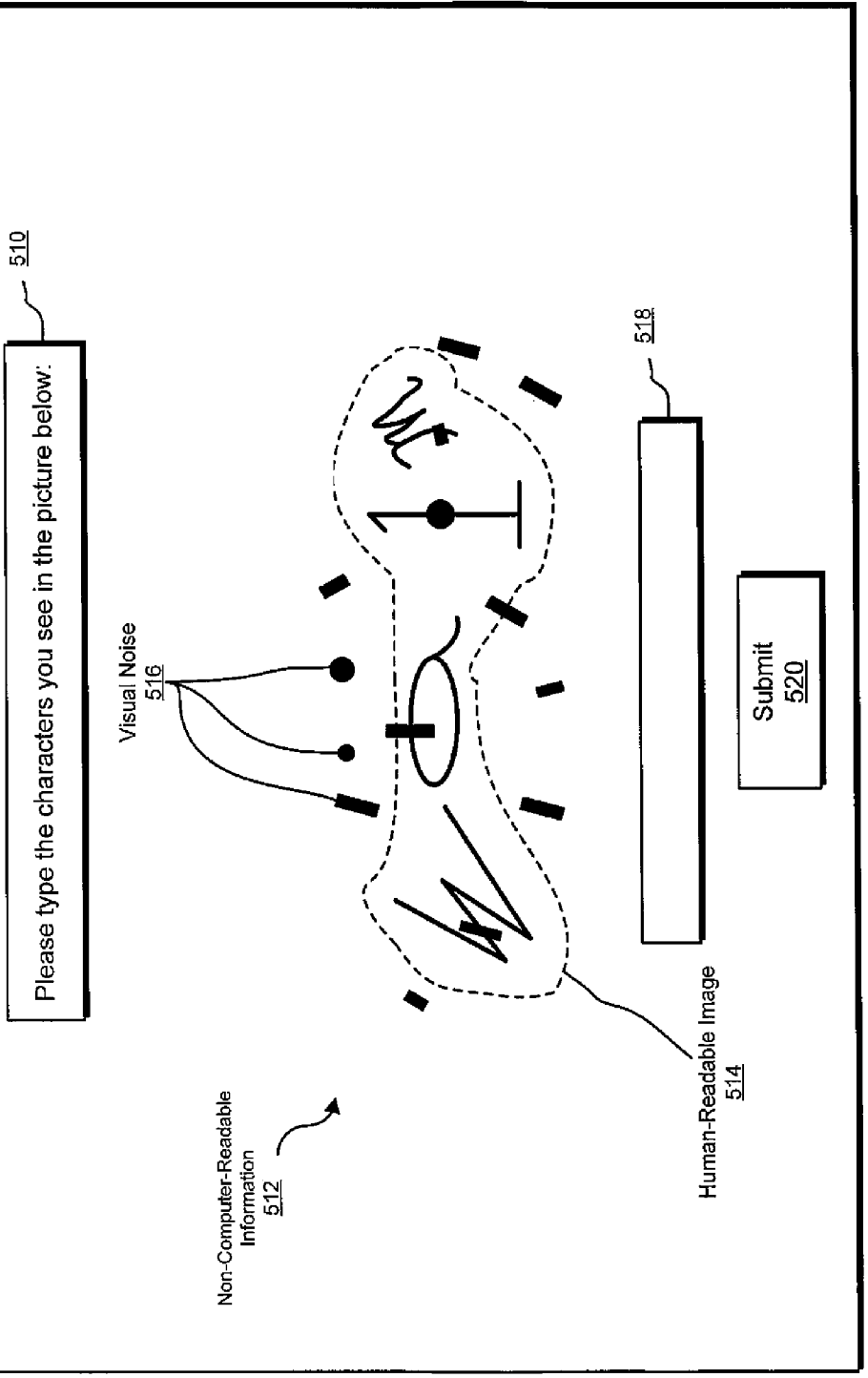
FIG. 5 is a block diagram of an exemplary human-verification test.

FIG. 5 is an illustration of an exemplary human-verification test 502. As illustrated in this figure, human-verification test 502 may comprise an explanatory text box 510 for prompting a user to identify a human-readable image 514 from within non-computer-readable information 512 and enter the same within a user-input box 518. The phrase "non-computer-readable information," as used herein, generally refers to information that may not be comprehended or processed by a computing device or software application. In certain examples, non-computer-readable information 512 may contain images or questions that may not be processed or comprehended by a computer. For example, as illustrated in FIG. 5, non-computer-readable information 512 may contain a human-readable image 514 ("Wa1m") that is in a format that prevents a computing device or a software application from extracting useful information. Alternatively, non-computer-readable information 512 may contain a relatively simple question that may be easily answered by a human, such as "What color is the sky?" or "What is 3 times 2?"

Human-readable image 514 in FIG. 5 generally represents any type or form of image that may be read or comprehended by a human. Examples of human-readable image 514 include, without limitation, bitmaps, jpegs, tiffs, or any other image format. In certain embodiments, human-readable image 514 may display information in a human-readable format that is unreadable by a computing device or software application.

In certain embodiments, non-computer-readable information 512 may comprise visual noise 516. As used herein, the phrase "visual noise" generally refers to information added to non-computer-readable information 512 in order to prevent a computing device or software program from extracting useful information. Examples of visual noise include, without limitation, various shapes and objects (such as lines, dashes, dots, or the like), background colors or patterns, or any other type of visual information that may be used to prevent a computing device or software program from extracting useful information from non-computer-readable information 512.

In at least one embodiment, human-readable image 514 may be created by transforming at least a portion of computer-readable text (such as the text "Wa1m"). Human-readable images may be transformed in a variety of ways. For example, in certain embodiments transforming at least a portion of a human-readable image may comprise rotating at least a portion of the human-readable image, stretching at least a portion of the human-readable image, and/or tilting at least a portion of the human-readable image.

In the example illustrated in FIG. 5, a user may complete human-verification test 502 by identifying human-readable image 514 from within non-computer-readable information 512, entering the same as text within user-input box 518, and then selecting user-selectable object 520. Security component 207 may then determine whether the answer supplied is correct.

Returning to FIG. 3, at step 306 the system may determine, based on the outcome of the human-verification test administered in step 304, whether to prevent modification of the network resource. For example, security component 207 on computing device 206 in FIG. 2 may prevent modification of network resource 202 if a response is not provided to the human-verification test administered in step 304 or if the response provided is incorrect. Alternatively, security component 207 may allow modification of network resource 202 if a correct answer to the human-verification test administered in step 304 is provided. Upon completion of step 306, exemplary method 300 in FIG. 3 may terminate.

Security component 207 on computing device 206 in FIG. 2 may prevent modification of network resource 202 in a variety of ways. In one example, security component 207 may prevent modification of network resource 202 by preventing computing device 206 from submitting data to or otherwise communicating with network resource 202.

As detailed above, exemplary method 300 in FIG. 3 may prevent unauthorized modification of a network resource in the absence of a user's consent. For example, security component 207 may prevent malicious code from causing computing device 206 to modify network resource 202 in FIG. 2 without the consent of a user of computing device 206.

Figure 6:
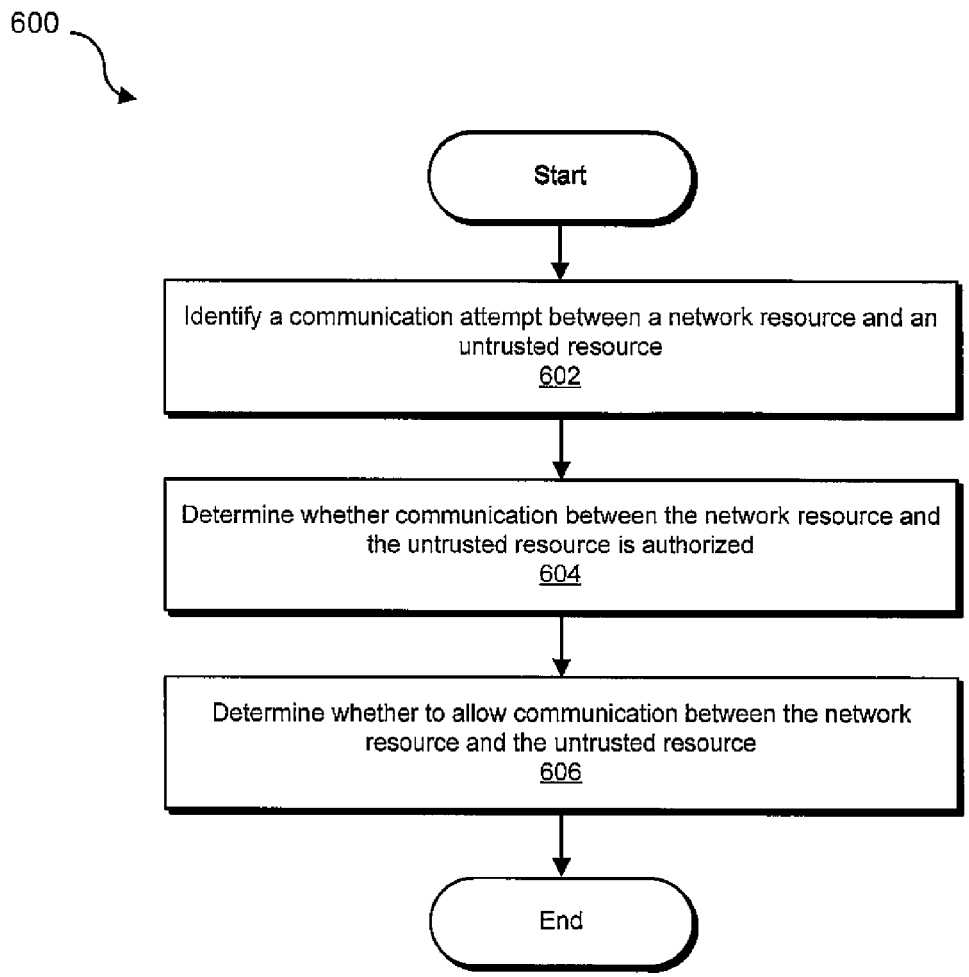
FIG. 6 is a flow diagram of an exemplary computer-implemented method for preventing unauthorized communication with network resources.

As detailed above, the instant disclosure also relates to a security agent stored on a network resource for preventing the network resource from communicating with unauthorized devices and services. FIG. 6 is a flow diagram of an exemplary method 600 for preventing a network resource from communicating with unauthorized devices and services. As illustrated in this figure, at step 602 a system (such as exemplary system 100 in FIG. 1) may identify a communication attempt between a network resource and an untrusted resource. For example, security agent 203 stored on network resource 202 in FIG. 2 may identify: 1) an attempt by network resource 202 to transmit data to an untrusted resource (such as computing device 206) and/or 2) an attempt by an untrusted resource (such as computing device 206) to transmit data to network resource 202.

The phrase "untrusted resource," as used herein, generally refers to an unknown device or service. In certain examples, such an untrusted resource may contain code that may be harmful to a network resource or a user of the network resource. For example, computing device 206 in FIG. 2 may represent an untrusted device that may contain malicious code, such as malware, designed to modify one or more settings of network resource 202.

Returning to FIG. 6, at step 604 the system may determine whether communication between the network resource and the untrusted resource is authorized. For example, security agent 203 stored on network resource 202 in FIG. 2 may determine whether communication between network resource 202 and computing device 206 is authorized.

Step 604 may be performed in a variety of ways. For example, security agent 203 may determine whether the untrusted resource identified in step 602 represents a trusted operating-system component, a trusted application, an authorized port, an authorized protocol, or the like. In certain embodiments, security agent 203 may make this determination using remote-discovery techniques. For example, security agent 203 may communicate with a trusted third-party source, such as trusted third-party resource 208 in FIG. 2, in order to verify that computing device 206 represents an authorized device. In an additional embodiment, security agent 203 may determine whether communication between network resource 202 and computing device 206 is authorized by: 1) receiving authentication information from computing device 206 and then 2) verifying this authentication information by comparing the same with locally stored information or with information stored on trusted third-party resource 208.

At step 606, the system may determine whether to allow communication between the network resource and the untrusted resource. If communication between the network resource and the untrusted resource is not authorized, then the system may prevent communication between the untrusted resource and the network resource. However, if communication between the untrusted resource and the network resource is authorized, then the system may allow communication between the untrusted resource and the network resource.

In one example, security agent 203 may prevent communication between network resource 202 and computing device 206 by blocking data from computing device 206 and/or by preventing network resource 202 from transmitting data to computing device 206. Similarly, security agent 203 may allow communication between network resource 202 and computing device 206 by allowing receipt of data from computing device 206 and/or allowing network resource 202 to transmit data to computing device 206. Upon completion of step 606 in FIG. 6, exemplary method 600 may terminate.

Although not illustrated in FIG. 6, in certain embodiments, exemplary method 600 may also comprise: 1) determining whether the network resource has been modified and then 2) transmitting a notification to a user that indicates that the network resource has been changed or modified. For example, security agent 203 in FIG. 2 may identify a settings change or modification to network resource 202. Security agent 203 may then cause network resource 202 to transmit a notification to a user of network resource 202 that identifies the settings change or modification to network resource 202. If the change or modification was unauthorized, the user may revert the settings of network resource 202 to their default by communicating with security agent 203.

As detailed above, exemplary system 600 in FIG. 6 may prevent an untrusted resource from communicating with a network resource. For example, security agent 203 in FIG. 2 may prevent computing device 206 from making one or more unauthorized settings changes or modifications to network resource 202.

Figure 7:
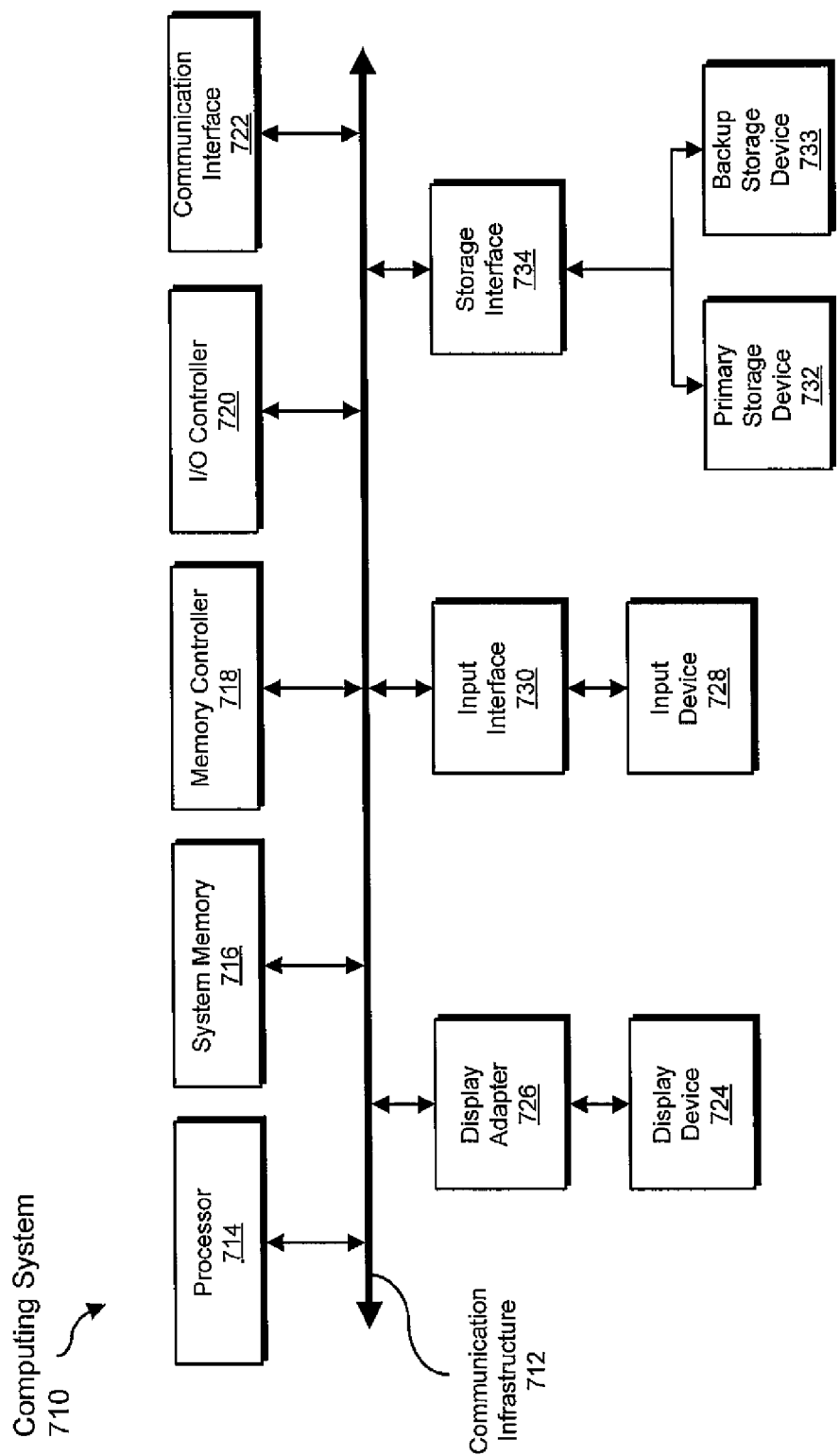
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may comprise at least one processor 714 and system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the identifying, administering, determining, embedding, preventing, allowing, transmitting, communicating, receiving, verifying, and blocking steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may comprise both a volatile memory unit (such as, for example, system memory 716) and a non-volatile storage device (such as, for example, primary storage device 732, as described in detail below).

In certain embodiments, exemplary computing system 710 may also comprise one or more components or elements in addition to processor 714 and system memory 716. For example, as illustrated in FIG. 7, computing system 710 may comprise a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller 718 may perform and/or be a means for performing, either alone or in combination with other elements, one or more of the steps or features described and/or illustrated herein, such as identifying, administering, determining, embedding, preventing, allowing, transmitting, communicating, receiving, verifying, and blocking.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for identifying, administering, determining, embedding, preventing, allowing, transmitting, communicating, receiving, verifying, and blocking steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network comprising additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the identifying, administering, determining, embedding, preventing, allowing, transmitting, communicating, receiving, verifying, and blocking steps disclosed herein. Communication interface 722 may also be used to perform and/or be a means for performing other steps and features set forth in the instant disclosure.

As illustrated in FIG. 7, computing system 710 may also comprise at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also comprise at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the identifying, administering, determining, embedding, preventing, allowing, transmitting, communicating, receiving, verifying, and blocking steps disclosed herein. Input device 728 may also be used to perform and/or be a means for performing other steps and features set forth in the instant disclosure.

As illustrated in FIG. 7, exemplary computing system 710 may also comprise a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory, device, or the like. Storage devices 732 and 733 may also comprise other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Storage devices 732 and 733 may also be used, for example, to perform and/or be a means for performing, either alone or in combination with other elements, one or more of the identifying, identifying, administering, determining, embedding, preventing, allowing, transmitting, communicating, receiving, verifying, and blocking steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
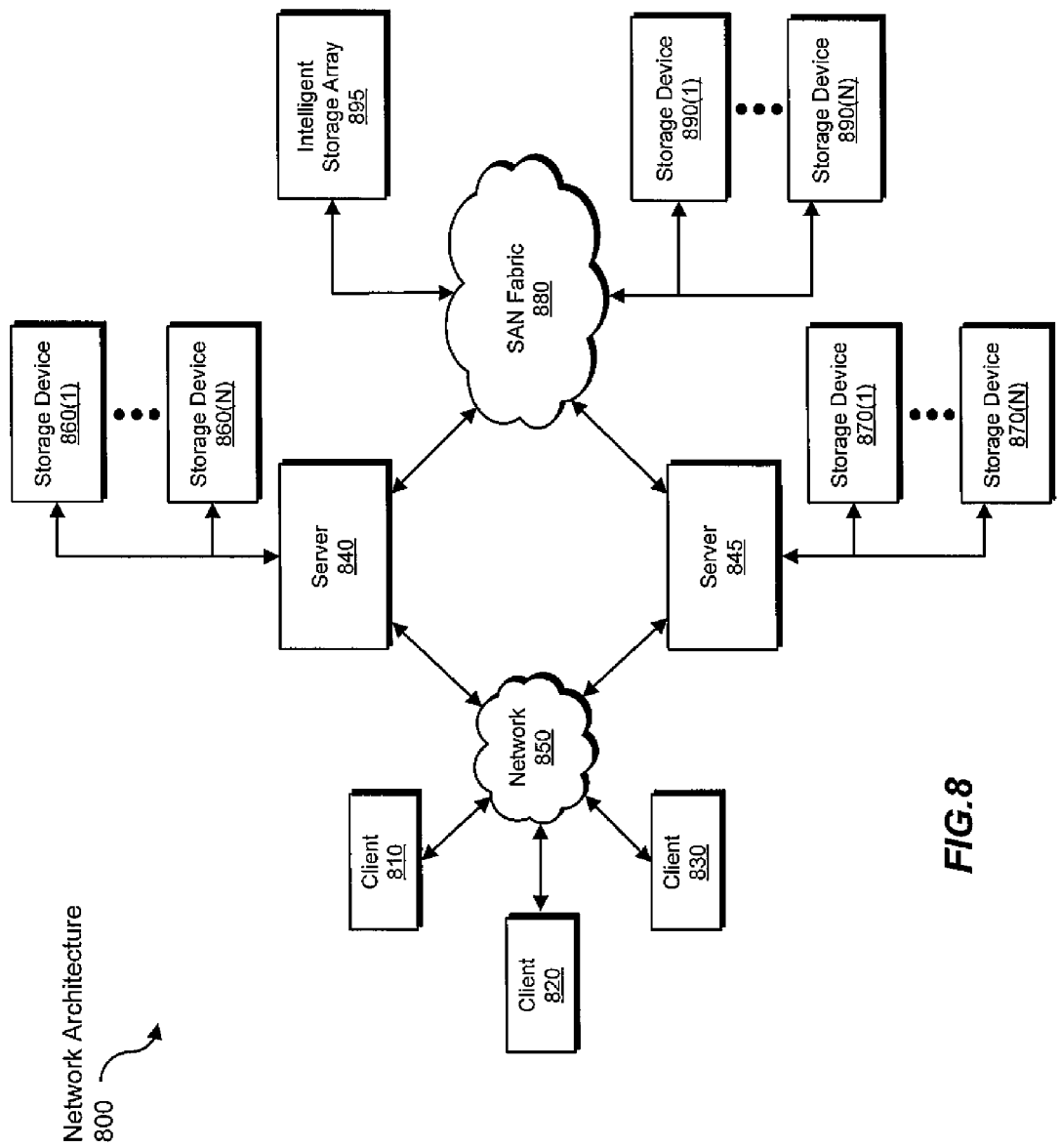
FIG. 8 is a block diagram of an exemplary network architecture capable of implementing one or more of the exemplary embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or to run certain software applications. Network 850 generally represents any telecommunication or computer network; including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the identifying, administering, determining, embedding, preventing, allowing, transmitting, communicating, receiving, verifying, and blocking steps disclosed herein. Network architecture 800 may also be used to perform and/or be a means for performing other steps and features set forth in the instant disclosure.

As detailed above, computing system 710 and/or one or more of the components of network architecture 800 may perform and/or be a means for performing, either alone or in combination with other elements, one or more steps of the exemplary methods described and/or illustrated herein. For example, computing system 710 and/or one or more of the components of network architecture 800 may perform and/or be a means for performing a computer-implemented method for preventing modification of network resources in the absence of a user's consent that may comprise: 1) identifying an attempt to modify a network resource, 2) administering a human-verification test, and then 3) determining, based on the outcome of the human-verification test, whether to prevent modification of the network resource. The network resource may represent a networked device or a network service.

In one example, identifying an attempt to modify a network resource may comprise: 1) identifying content received from a network resource and then 2) determining whether the content received from the network may facilitate modification of the network resource. Content received from a network resource may be detected or identified by identifying content received from an intranet zone and/or an intranet IP address.

In one example, the human-verification test may represent a CAPTCHA or other Turing test. This human-verification test may be administered by embedding the same within a web browser of a computing device that is in communication with the network resource. If an incorrect response to the human-verification test is provided, or if no response is provided, then modification of the network resource may be prevented. Alternatively, modification of the network resource may be allowed if a correct response to the human-verification test is provided. In one embodiment, modification of the network resource may be prevented by preventing the submission of data to the network resource. In certain situations, a notification that indicates the outcome of the human-verification test may be transmitted to a user of the network resource.

Computing system 710 and/or one or more of the components of network architecture 800 may also perform and/or be a means for preventing unauthorized communication with a network resource by: 1) identifying a communication attempt between a network resource and an untrusted resource, 2) determining whether communication between a network resource and the untrusted resource is authorized, and then 3) determining, based on whether communication between the network resource and the untrusted resource is authorized, whether to allow communication between the network resource and the untrusted resource.

The communication attempt between the network resource and the untrusted resource may be identified by identifying an attempt by the untrusted resource to transmit data to the network resource or identifying an attempt by the network resource to transmit data to the untrusted resource. In addition, determining whether communication between the network resource and the untrusted resource is authorized may comprise determining whether the untrusted resource represents a trusted operating-system component, a trusted application, an authorized port, and/or an authorized protocol.

In one example, the method may further comprise communicating with a trusted third-party resource. Determining whether communication between the network resource and the untrusted resource is authorized may comprise receiving authentication information from the untrusted resource and verifying the authentication information. The method may also comprise preventing communication between the untrusted resource and the network resource if communication between the network resource and the untrusted resource is not authorized or allowing communication between the untrusted resource and the network resource if communication between the network resource and the untrusted resource is authorized.

Communication between the untrusted resource and the network resource may be prevented by: 1) blocking data from the untrusted resource and/or 2) preventing the network resource from transmitting data to the untrusted resource. Similarly, allowing communication between the untrusted resource and the network resource may comprise allowing receipt of data from the untrusted resource and/or allowing the network resource to transmit data to the untrusted resource. The method may also comprise determining whether the network resource has been modified and then transmitting a notification that indicates modification of the network resource.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for preventing modification of network resources in the absence of a user's consent, at least a portion of the method being performed by a client device comprising at least one processor, the method comprising:

identifying an attempt by the client device to modify a local network resource at least in part by:

detecting content received from an intranet indicating that the content originated from the local network resource;

determining, at the client device, that the content received from the local network resource may facilitate modification of at least one setting of the network resource by determining that the content received from the local network resource facilitates user input via a web-based form;

in response to the determination that the content received from the local network resource may facilitate modification of at least one setting of the local network resource, determining, at the client device, whether the attempt by the client device to modify the local network resource represents an unauthorized attempt to modify the local network resource without the consent of a user of the client device at least in part by:

embedding, at the client device, a human-verification test within the content received from the local network resource;

administering the human-verification test at the client device;

determining, at the client device based on the outcome of the human-verification test, whether to prevent modification of the local network resource.

2. The method of claim 1, wherein identifying the content received from the local network resource comprises at least one of:

identifying content received from an intranet zone;

identifying content received from an intranet IP address.

3. The method of claim 1, wherein the local network resource comprises at least one of:

a networked device within a local area network of the client device;

a network service within a local area network of the client device.

4. The method of claim 3, wherein the networked device comprises a router within a local area network of the client device.

5. The method of claim 1, wherein administering the human-verification test comprises:

administering a Turing test;

administering a CAPTCHA.

6. The method of claim 1, wherein administering the human-verification test at the client device comprises embedding the human-verification test within a web browser of the client device.

7. The method of claim 1, wherein determining whether to prevent modification of the local network resource comprises:

preventing modification of the local network resource if a response to the human-verification test is not provided;

preventing modification of the local network resource if an incorrect response to the human-verification test is provided;

allowing modification of the local network resource if a correct response to the human-verification test is provided.

8. The method of claim 7, wherein preventing modification of the local network resource comprises preventing submission of data to the local network resource.

9. The method of claim 7, further comprising transmitting a notification that indicates the outcome of the human-verification test.

10. A system for preventing unauthorized modification of network resources, the system comprising:

a client device, the client device comprising at least one processor configured to execute at least one module programmed to:

identify an attempt by the client device to modify a local network resource at least in part by:

detecting content received from an intranet indicating that the content originated from the local network resource;

determining, at the client device, that the content received from the local network resource may facilitate modification of at least one setting of the network resource by determining that the content received from the local resource facilitates user input via a web-based form;

in response to the determination that the content received from the local network resource may facilitate modification of at least one setting of the local network resource, determining, at the client device, whether the attempt by the client device to modify the local network resource represents an unauthorized attempt to modify the local network resource without the consent of a user of the client device at least in part by:

embedding, at the client device, a human-verification test within the content received from the local network resource;

administering the human-verification test at the client device;

determine, at the client device based on the outcome of the human-verification test, whether to prevent the client device from modifying the local network resource.

11. The system of claim 10, wherein the local network resource comprises at least one module programmed to:

identify a communication attempt between the client device and the local network resource;

determine whether communication between the client device and the local network resource is authorized;

determine, based on whether communication between the client device and the local network resource is authorized, whether to allow communication between the client device and the local network resource.

* * * * *